Patented Sept. 23, 1947

2,427,709

UNITED STATES PATENT OFFICE 2,427,709

CHEMICAL PRODUCTION OF OXYGEN

Eugene O. Brimm, Kenmore, N. Y., assignor to The Linde Air Products Company, a corporation of Ohio No Drawing. Application July 3, 1942,
Serial No. 449,684

12 Claims. (Cl. 23—221)

This invention relates to a novel chemical process for extracting oxygen from a mixture of oxygen with inert gas, and more particularly for separating and collecting gaseous oxygen of high purity from the atmosphere. The invention is also concerned with a novel chemical contact mass for use in the process. More particularly, the invention relates to improvements on the process of Du Motay and Marechal disclosed in United States Patent No. 70,705 of November 12, 1867.

The process of Du Motay et al. is performed by alternately passing air and steam through a closed retort over a hot alkali manganate or similar reaction mass having the ability to be oxidized by the passage of air thereover, and thereafter to be deoxidized and release gaseous oxygen during the passage of steam thereover. The reversible reaction theoretically is:

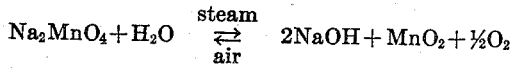

$$Na_2MnO_4 + H_2O \underset{air}{\overset{steam}{\rightleftarrows}} 2NaOH + MnO_2 + \tfrac{1}{2}O_2$$

Various reaction masses may be used in the process, as disclosed by Du Motay et al., including the manganates and permanganates of potassium, sodium, or barium, as well as the chromates and ferrates of these metals, and in general all metallic acids or oxides forming, with potassium, sodium, or barium, binary combinations capable of becoming super-oxidized, and also possessing the property of releasing their oxygen at a temperature more or less elevated when they are placed in the presence of a current of steam. During the passage of steam over the hot mass, the gaseous oxygen is collected while the residual steam is condensed and separated from the oxygen. Oxygen of 95% purity or better may be obtained by this process. Of course the nitrogen residue from the air phase of the cycle also may be collected, if this is desired.

The basic process of Du Motay et al. has not been commercially successful in competition with other methods of producing oxygen because of several disadvantages rendering the process economically unprofitable. One of the principal drawbacks of the Du Motay et al. process is the instability of the reaction mass, which deteriorates rapidly after being in service only a short time, with a resulting low oxygen production based on the quantities of air and steam passed over the mass. Moreover, the process consumes huge quantities of steam for the production of oxygen on a large scale, thus making the cost of operation prohibitive. Another serious disadvantage is the relatively great size and cost of the equipment and plant required for producing oxygen on a large scale, necessitating a large initial investment.

Several attempts have been made by subsequent investigators to improve the fundamental Du Motay et al. process to permit the production of oxygen economically. Development has been mainly aimed at improving the physical or chemical character of the reaction mass for better stability and greater efficiency of oxygen production. Among the best known of these improvements is that proposed by George Kaszner in United States Patent 1,015,566, of January 23, 1912. Kaszner teaches the addition to the alkali manganate mass of an alkali meta-plumbate, such as sodium meta-plumbate, for increased stability. Despite the alleged improvement in the stability of the reaction mass, however, there is no substantial increase in the efficiency of oxygen production based on the quantities of steam and air supplied to the mass, excessive quantities of steam being required for oxygen production on a large scale. Furthermore, experiments have shown that Kaszner's "Plumboxan" contact mass is quite unstable because of the gradual volatilization of lead compounds from the mass during operation at high temperatures.

The principal object of the present invention, therefore, is to provide a novel chemical process extracting oxygen from a mixture of oxygen with inert gas, particularly for producing oxygen from the air without the disadvantages of the prior processes discussed above. Another object is the provision of a novel process for producing oxygen by the alternate passage of air and steam over a hot contact mass whereby improved yields of oxygen are obtained. Another object is the provision of such a process which will remain operative over a long period of time. Still another object is the provision of novel contact masses which give an improved combination of high oxygen yield and good stability when steam and air are passed alternately over the mass.

The above and other objects, and the novel features of the invention, will become apparent from the following detailed description:

Generally, the process of this invention comprises passing flowing streams alternately of air and steam over a hot solid manganate type contact mass which is a sintered material comprising complexes of manganese, oxygen, molybdenum, and an alkali metal. The mass has a composition and relationship of elements such as theoretically to form a double manganate-molybdate salt $yX_2MnO_4.X_2MoO_4$, or $$yX_2MnO_4.X_2MoO_4.X_2O$$

wherein X is an alkali metal and $y$ is from 2 to 4. The alkali metal is in excess of the amount required in the double salt by an amount substantially just sufficient theoretically to combine with any other uncombined acidic materials in the mass. The mass is oxidized during the passage of air thereover, and the oxygen is subsequently liberated from the mass and passes off with residual steam during the steam phase of the process. The residual steam then is condensed and the gaseous oxygen collected for immediate or future use. The cycling of air and steam over the contact mass may be continued indefinitely as long as the contact mass remains reasonably stable. It has been found that with this process, wherein an oxide or salt of molybdenum is added to the mixture for producing a contact mass, improved yields of oxygen are obtained coupled with a mass stability at least as good as that of the "Plumboxan" mass of the Kaszner patent, and better than that of the simple Du Motay manganate contact mass.

In one specific form of contact mass used in the process of the invention, just enough of the sodium or potassium hydroxide is added theoretically to react stoichiometrically with all of the oxide of manganese and all of the molybdenum compound to form, when sintered, sodium or potassium manganate and molybdate. The quantity of the hydroxide added to react with the oxide of manganese is based on the assumption that the components react completely with one another to form the compounds $Na_2MnO_4$ or $K_2MnO_4$; and the quantity of the hydroxide added to react with the oxide or salt of molybdenum is calculated on the assumption that the compounds $Na_2MoO_4$ or $K_2MoO_4$ are obtained. It is known, however, that in reality only a small part of the components react with one another to produce these definite compounds, and the balance of the mass may consist of a heterogeneous mixture of complex and simple salts and oxides of manganese with salts and oxides of molybdenum. No exact chemical formula may be assigned to any mass because of this heterogeneity.

The masses may be prepared with atomic ratios of anywhere between 2 and 4 atoms of manganese to 1 atom of molybdenum. For example, when preparing a contact mass on the basis of an atomic ratio of 2 to 1, the quantities of the components mixed together are based on the theoretical formation of a double manganate-molybdate salt having the formula $$2Na_2MnO_4 \cdot Na_2MoO_4$$

although there is no evidence that such a compound actually is formed. For an atomic ratio of 4 to 1, the components are mixed together on the basis of the formula $4Na_2MnO_4 \cdot Na_2MoO_4$. Atomic ratios of 4 to 1 have been found to give the best results in practice.

In a typical example of the preparation of a contact mass, 121 grams of $Na_2MoO_4 \cdot 2H_2O$ were mixed with 181 grams of $MnO_2$ (60.7% Mn) and 163.2 grams of NaOH (98% NaOH), and the mixture sintered at 1680° F. Samples of the resulting mass, having theoretically the formula $$4Na_2MnO_4 \cdot Na_2MoO_4$$

(based on the quantities of components added to form the mixture), were cycled with air and steam at about 1200° F. and at about 1290° F. for 10 minute cycles (5 minutes to each phase) at about atmospheric pressure. For equal weights of samples oxygen yields of 210 cc. and 200 cc., were obtained at 1200° F. and 1290° F., respectively.

In a modified form of contact mass, an excess of the oxidic compound of the alkali metal was added to the mixture before sintering. A large increase in the catalytic activity of the mass containing molybdenum was noticed when it was cycled with air and steam. The amount of the hydroxide which gives the best results is that required stoichiometrically to produce a compound having the theoretical formula $$4Na_2MnO_4 \cdot Na_2MoO_4 \cdot Na_2O$$

when molybdenum is used, although there is no evidence that this compound is actually obtained. Better oxygen yields were obtained with molybdenum catalysts when the masses were prepared at 1470° F. than when they were prepared at 1830° F. or 2190° F.

The results with masses having various ratios of manganese to molybdenum, and the effect of excess hydroxide on the masses are illustrated in the following table, showing the results of tests made by alternately passing air and steam over equal weights of sample under similar conditions at 1290° F. and atmospheric pressure:

| Theoretical Formula | Atomic Ratio | | | Sintering Temp., °F. | Oxygen Yield (cc. per sample) |
|---|---|---|---|---|---|
| $Na_2MnO_4.Na_2MoO_4$ | 4Na | 1Mn | 1Mo | 1,290 | 85 |
| $2Na_2MnO_4.Na_2MoO_4$ | 6Na | 2Mn | 1Mo | 1,520 | 178 |
| $4Na_2MnO_4.Na_2MoO_4$ | 10Na | 4Mn | 1Mo | 1,680 | 200 |
| $4Na_2MnO_4.Na_2MoO_4.Na_2O$ | 12Na | 4Mn | 1Mo | 1,290 | 203 |

The following table shows examples illustrating the superiority of compounds of molybdenum over several other compounds for addition to manganate contact masses. The contact masses were tested all under similar conditions by passing air and steam alternately over samples of equal weight at 1200° F. for 10 minute cycles (5 minutes to each phase) at about atmospheric pressure.

| Addition | Atomic Ratio In Mass | | | Sintering Temp., °F. | Oxygen Yield (cc./sample) |
|---|---|---|---|---|---|
| Molybdenum | 6Na | 2Mn | 1Mo | 1,520 | 17: |
| Do | 10Na | 4Mn | 1Mo | 1,680 | 21( |
| Lead | 4Na | 1Mn | 1Pb | 1,700 | 3: |
| Do | 6Na | 2Mn | 1Pb | 1,740 | 5( |
| Do | 10Na | 4Mn | 1Pb | 1,740 | 5. |
| Bismuth | 5Na | 2Mn | 1Bi | 1,350 | 8 |
| Arsenic | 5Na | 2Mn | 1As | 2,140 | |
| Tin | 6Na | 2Mn | 1Sn | 2,190 | 6 |
| Vanadium | 5Na | 2Mn | 1V | 2,080 | 1 |
| Tungsten | 6Na | 2Mn | 1W | 1,510 | 5 |
| Antimony | 5Na | 2Mn | 1Sb | 2,080 | 1 |
| Phosphorus | 5Na | 2Mn | 1P | 2,070 | 1 |

Not only were the yields of oxygen obtained when using a compound of molybdenum superio to the yields obtained with any of the oxides o salts of the other listed elements, but also th masses containing molybdenum were at least as stable as the other masses tested, and in some cases, more stable.

Contact masses may be prepared using ore containing manganese dioxide, such as pyrolusite containing about 72% $MnO_2$. As such ores usually contain quantities of uncombined acidic impurities such as silicon dioxide, it is important to use sufficient excess oxidic compound of the alkali metals theoretically to combine not only with the oxide of manganese and the molybdenum compound, but also with the acidic impurities.

No satisfactory theory has been developed to explain the superior results obtainable when oxides or salts of molybdenum are used with manganate contact masses. Kaszner, in his Patent 1,015,566, advanced the theory that his plumbate reacted with free alkali liberated during the steam phase of the process and prevented segregation of alkali from the rest of the mass. There is no strong evidence, however, that this theory is correct. Moreover, there is no evidence that the oxides or salts used according to this invention act in the same way as does the plumbate of Kaszner, irrespective of whether Kaszner's theory is or is not correct.

What is claimed is:

1. A solid manganate type contact mass characterized by its ability to be deoxidized and oxidized alternately by steam and air, respectively, said mass being a sintered material comprising complexes of manganese, oxygen, molybdenum, and an alkali metal, said material having a composition and relationship of elements such as theoretically to form a double manganate-molybdate salt $yX_2MnO_4.X_2MoO_4$, wherein X is an alkali metal and $y$ is from 2 to 4, said alkali metal being in excess of the amount required in said double salt by an amount substantially just sufficient theoretically to combine with the other uncombined acidic materials in the mass.

2. A solid manganate type contact mass characterized by its ability to be deoxidized and oxidized alternately by steam and air, respectively, said mass being a sintered material comprising complexes of manganese, oxygen, molybdenum, and sodium, said material having a composition and relationship of elements such as theoretically to form a double manganate-molybdate salt $yNa_2MnO_4.Na_2MoO_4$, wherein $y$ is from 2 to 4, said sodium being in excess of the amount required in said double salt by an amount substantially just sufficient theoretically to combine with the other uncombined acidic materials in the mass.

3. A solid manganate type contact mass characterized by its ability to be deoxidized and oxidized alternately by steam and air, respectively, said mass being a sintered material comprising complexes of manganese, oxygen, molybdenum, and potassium, said material having a composition and relationship of elements such as theoretically to form a double manganate-molybdate salt $yK_2MnO_4.K_2MoO_4$, wherein $y$ is from 2 to 4, said potassium being in excess of the amount required in said double salt by an amount substantially just sufficient theoretically to combine with the other uncombined acidic materials in the mass.

4. A solid manganate type contact mass characterized by its ability to be deoxidized and oxidized alternately by steam and air, respectively, said mass being a sintered material comprising complexes of manganese, oxygen, molybdenum, and an alkali metal, said material having a composition and relationship of elements such as theoretically to form a double manganate-molybdate salt $yX_2MnO_4.X_2MoO_4.X_2O$, wherein X is an alkali metal and $y$ is from 2 to 4, said alkali metal being in excess of the amount required in said double salt by an amount substantially just sufficient theoretically to combine with the other uncombined acidic materials in the mass.

5. A solid manganate type contact mass characterized by its ability to be deoxidized and oxidized alternately by steam and air, respectively, said mass being a sintered material comprising complexes of manganese, oxygen, molybdenum, and sodium, said material having a composition and relationship of elements such as theoretically to form a double manganate-molybdate salt $yNa_2MnO_4.Na_2MoO_4.Na_2O$, wherein $y$ is from 2 to 4, said sodium being in excess of the amount required in said double salt by an amount substantially just sufficient theoretically to combine with the other uncombined acidic materials in the mass.

6. A solid manganate type contact mass characterized by its ability to be deoxidized and oxidized alternately by steam and air, respectively, said mass being a sintered material comprising complexes of manganese, oxygen, molybdenum, and potassium, said material having a composition and relationship of elements such as theoretically to form a double manganate-molybdate salt $yK_2MnO_4.K_2MoO_4.K_2O$, wherein $y$ is from 2 to 4, said potassium being in excess of the amount required in said double salt by an amount substantially just sufficient theoretically to combine with the other uncombined acidic materials in the mass.

7. A process for extracting oxygen from a mixture of oxygen with inert gas comprising alternately passing streams of said mixture and steam over a hot solid manganate type contact mass characterized by its ability to be deoxidized and oxidized alternately by steam and oxygen, respectively, said mass being a sintered material comprising complexes of manganese, oxygen, molybdenum, and an alkali metal, said material having a composition and relationship of elements such as theoretically to form a double manganate-molybdate salt $yX_2MnO_4.X_2MoO_4$, wherein X is an alkali metal and $y$ is from 2 to 4, said alkali metal being in excess of the amount required in said double salt by an amount substantially just sufficient theoretically to combine with the other uncombined acidic materials in the mass.

8. A process for extracting oxygen from a mixture of oxygen with inert gas comprising alternately passing streams of said mixture and steam over a hot solid manganate type contact mass characterized by its ability to be deoxidized and oxidized alternately by steam and oxygen, respectively, said mass being a sintered material comprising complexes of manganese, oxygen, molybdenum, and sodium, said material having a composition and relationship of elements such as theoretically to form a double manganate-molybdate salt $yNa_2MnO_4.Na_2MoO_4$, wherein $y$ is from 2 to 4, said sodium being in excess of the amount required in said double salt by an amount substantially just sufficient theoretically to combine with the other uncombined acidic materials in the mass.

9. A process for extracting oxygen from a mixture of oxygen with inert gas comprising alternately passing streams of said mixture and steam over a hot solid manganate type contact mass characterized by its ability to be deoxidized and oxidized alternately by steam and oxygen, respectively, said mass being a sintered material comprising complexes of manganese, oxygen, molybdenum, and potassium, said material having a composition and relationship of elements such as theoretically to form a double manganate-molybdate salt $yK_2MnO_4.K_2MoO_4$, wherein $y$ is from 2 to 4, said potassium being in excess of the amount required in said double salt by an amount substantially just sufficient theoretically to combine with the other uncombined acidic materials in the mass.

10. A process for extracting oxygen from a mixture of oxygen with inert gas comprising alternately passing streams of said mixture and steam over a hot solid manganate type contact mass characterized by its ability to be deoxidized and oxidized alternately by steam and oxygen, respectively, said mass being a sintered material comprising complexes of manganese, oxygen, molybdenum, and an alkali metal, said material having a composition and relationship of elements such as theoretically to form a double manganate-molybdate salt $yX_2MnO_4.X_2MoO_4.X_2O$, wherein X is an alkali metal and $y$ is from 2 to 4, said alkali metal being in excess of the amount required in said double salt by an amount substantially just sufficient theoretically to combine with the other uncombined acidic materials in the mass.

11. A process for extracting oxygen from a mixture of oxygen with inert gas comprising alternately passing streams of said mixture and steam over a hot solid manganate type contact mass characterized by its ability to be deoxidized and oxidized alternately by steam and oxygen, respectively, said mass being a sintered material comprising complexes of manganese, oxygen, molybdenum, and sodium, said material having a composition and relationship of elements such as theoretically to form a double manganate-molybdate salt $yNa_2MnO_4.Na_2MoO_4.Na_2O$, wherein $y$ is from 2 to 4, said sodium being in excess of the amount required in said double salt by an amount substantially just sufficient theoretically to combine with the other uncombined acidic materials in the mass.

12. A process for extracting oxygen from a mixture of oxygen with inert gas comprising alternately passing streams of said mixture and steam over a hot solid manganate type contact mass characterized by its ability to be deoxidized and oxidized alternately by steam and oxygen, respectively, said mass being a sintered material comprising complexes of manganese, oxygen, molybdenum, and potassium, said material having a composition and relationship of elements such as theoretically to form a double manganate-molybdate salt $yK_2MnO_4.K_2MoO_4.K_2O$, wherein $y$ is from 2 to 4, said potassium being in excess of the amount required in said double salt by an amount substantially just sufficient theoretically to combine with the other uncombined acidic materials in the mass.

EUGENE O. BRIMM.

REFERENCES CITED

The following references are of record in the file of this patent:

UNITED STATES PATENTS

| Number | Name | Date |
| --- | --- | --- |
| 500,697 | Webb | July 4, 1893 |
| 1,694,122 | Jaeger | Dec. 4, 1928 |
| 1,900,751 | Baehr | Mar. 7, 1933 |
| 2,086,507 | Larson | July 6, 1937 |
| 2,135,058 | Spicer | Nov. 1, 1938 |